(12) United States Patent
Vakoc et al.

(10) Patent No.: US 12,174,115 B2
(45) Date of Patent: Dec. 24, 2024

(54) RESOLVING ABSOLUTE DEPTH IN CIRCULAR-RANGING OPTICAL COHERENCE TOMOGRAPHY

(71) Applicant: The General Hospital Corporation, Boston, MA (US)

(72) Inventors: Benjamin Vakoc, Arlington, MA (US); Norman Lippok, Cambridge, MA (US)

(73) Assignee: The General Hospital Corporation, Boston, MA (US)

( * ) Notice: Subject to any disclaimer, the term of this patent is extended or adjusted under 35 U.S.C. 154(b) by 0 days.

(21) Appl. No.: 17/755,452

(22) PCT Filed: Oct. 30, 2020

(86) PCT No.: PCT/US2020/058320
§ 371 (c)(1),
(2) Date: Apr. 29, 2022

(87) PCT Pub. No.: WO2021/087333
PCT Pub. Date: May 6, 2021

(65) Prior Publication Data
US 2024/0159668 A1 May 16, 2024

Related U.S. Application Data

(60) Provisional application No. 62/929,390, filed on Nov. 1, 2019.

(51) Int. Cl.
*G01B 9/02091* (2022.01)
*G01B 9/02* (2022.01)
(Continued)

(52) U.S. Cl.
CPC ............... *G01N 21/45* (2013.01); *G01B 9/02* (2013.01); *G01B 9/02007* (2013.01); *G01B 9/02008* (2013.01); *G01B 9/02091* (2013.01)

(58) Field of Classification Search
CPC ...... G01N 21/45; G01B 9/02; G01B 9/02007; G01B 9/02008; G01B 9/02091
See application file for complete search history.

(56) References Cited

U.S. PATENT DOCUMENTS 9,903,808 B2 * 2/2018 Plusquellic ............ G01N 21/39
2005/0199510 A1 * 9/2005 Kochergin ......... G02B 27/1073
205/640

(Continued)

FOREIGN PATENT DOCUMENTS

| JP | 2012-154728 A | 8/2012 |
|---|---|---|
| JP | 2019-512086 A | 5/2019 |
| WO | 2021087333 | 5/2021 |

OTHER PUBLICATIONS

Bak, S. et al., Dual-Band Wavelength-Comb-Swept Laser to Extend Displacement Measurement Range, Optical Coherence Imaging Techniques and Imaging in Scattering Media III, Proc. of SPIE-OSA, 2019, vol. 11078, pp. 110781W-1-110781W-3.

(Continued)

*Primary Examiner* — Jonathan M Hansen
(74) *Attorney, Agent, or Firm* — Quarles & Brady LLP

(57) ABSTRACT

An apparatus, including: an electromagnetic radiation source producing radiation for illuminating a sample located at an optical path depth, the electromagnetic radiation source providing the radiation to the sample to facilitate determining the optical path depth within the sample: an interferometer including: a reference arm a first portion of the radiation is delivered to, a sample arm to which a second portion of the radiation is delivered, a first optical subsystem coupled to the sample arm to interrogate the sample with the radiation delivered to the sample arm and to collect backscattered radiation from the sample, and a second optical subsystem coupled to the reference arm and the first optical subsystem to generate interference fringes between the collected back- (Continued)

scattered radiation and the radiation delivered to the reference arm; and a data collection and processing system configured to compute the optical path depth of the sample from the received interference fringes.

24 Claims, 13 Drawing Sheets

(51) Int. Cl.
*G01B 9/02001* (2022.01)
*G01N 21/45* (2006.01)

(56) References Cited

U.S. PATENT DOCUMENTS

| | | | |
|---|---|---|---|
| 2007/0002327 A1 | 1/2007 | Zhou et al. | |
| 2007/0024860 A1 | 2/2007 | Tobiason et al. | |
| 2008/0174785 A1 | 7/2008 | Seitz et al. | |
| 2011/0170110 A1* | 7/2011 | Oigawa | H01S 5/0608 372/20 |
| 2013/0308096 A1 | 11/2013 | Engelhardt et al. | |
| 2014/0085632 A1 | 3/2014 | Preston et al. | |
| 2015/0159990 A1 | 6/2015 | Plusquellic et al. | |
| 2016/0278629 A1* | 9/2016 | Schuele | A61B 3/1225 |
| 2019/0049232 A1* | 2/2019 | Vakoc | H03M 1/20 |
| 2019/0391016 A1* | 12/2019 | Bourbeau Hébert | G01B 9/02008 |

OTHER PUBLICATIONS

Lippok, N. et al., Highly-Stable, Multi-Megahertz Circular-Ranging Optical Coherence Tomography at 1.3 um, arXiv:1910.09462v2, Oct. 30, 2019, 11 pages.
Nakamura, K. et al., Optical Frequency Domain Ranging by a Frequency-Shifted Feedback Laser, IEEE Journal of Quantum Electronics, 2000, 36(3):305-316.
Rovati, L., A PC-Controlled Non-Incremental Distance Meter Based on a Comb-Spectrum Combined with a Frequency Modulated Continuous Wave Interferometer, IEEE Instrumentation and Measurement Technology Conference, 2021, pp. 1401-1405.
Wu, G. et al., Synthetic Wavelength Interferometry of an Optical Frequency Comb for Absolute Distance Measurement, Scientific Reports, 2018, 8:4362, pp. 1-7.
European Patent Office, Extended Search Report, Application No. 20882621.4, Oct. 18, 2023, 11 pages.
Banh et al., "Development of an incoherent optical frequency comb interferometer for long-range and scanless profilometry and tomography," Opt. Commun. 296, 1-8 (2013).
International Search Report and Written Opinion issued in corresponding PCT Application No. PCT/US2020/058320, mailed Feb. 3, 2021.
Lippok et al., "Extended Coherence Length and Depth Ranging Using a Fourier-Domain Mode-Locked Frequency Comb and Circular Interferometric Ranging," Phys. Rev. Applied 11(1), 014018 (2019).
Lippok et al., "Stable multi-megahertz circular-ranging optical coherence tomography at 1.3 μm," Biomedical Optics Express, vol. 11, No. 1, Jan. 1, 2020 . . . .
Siddiqui et al., "Compensation of spectral and RF errors in swept-source OCT for high extinction complex demodulation," Opt. Express 23(5), 5508-5520 (2015).
Siddiqui et al., "High-speed optical coherence tomography by circular interferometric ranging," Nat. Photonics 12, 111-116 (2018).
Siddiqui et al., "Optical-domain subsampling for data efficient depth ranging in Fourier-domain optical coherence tomography," Opt. Express 20(16), 17938-17951 (2012).
Vakoc et al., "Resolving absolute depth in Circular-Ranging Optical Coherence Tomography by using a degenerate frequency comb," Optics Letters, pp. 1-5, (2019).
Office Action in Japanese Application No. 2022-525226; received on Sep. 3, 2024.

\* cited by examiner

RESOLVING ABSOLUTE DEPTH IN CIRCULAR-RANGING OPTICAL COHERENCE TOMOGRAPHY

CROSS REFERENCE TO RELATED APPLICATIONS

The present application is a U.S. National Phase of PCT Application PCT/US2020/058320 filed on Oct. 30, 2020 which relates to and claims priority from U.S. Patent Application Ser. No. 62/929,390, filed on Nov. 1, 2019. Each of the preceding patent applications is hereby incorporated herein by reference in its entirety.

STATEMENT REGARDING FEDERALLY SPONSORED RESEARCH

This invention was made with government support under grant number P41EB015903 awarded by the National Institutes of Health. The government has certain rights in the invention.

BACKGROUND

Subsampled OCT is an imaging technology capable of providing high speeds and operating over long ranges. It achieves this by performing an optical-domain compression of the generated interference signals through the use of optical subsampling. Traditionally, this has been achieved by using a single frequency comb source, i.e. a source that includes individual spectral lines that are equi-spaced in optical frequency. However, these techniques are unable to determine the absolute depth, which can be a limitation for certain applications.

SUMMARY OF THE INVENTION

Accordingly, new systems, methods, and media for resolving absolute depth in circular-ranging optical coherence tomography are desirable.

In one embodiment, the invention provides an apparatus, including: an electromagnetic radiation source producing radiation for illuminating a sample located at an optical path depth, the electromagnetic radiation source providing the radiation to the sample to facilitate determining the optical path depth within the sample; an interferometer including: a reference arm to which a first portion of the radiation is delivered, a sample arm to which a second portion of the radiation is delivered, a first optical subsystem coupled to the sample arm to interrogate the sample with the radiation delivered to the sample arm and to collect backscattered radiation from the sample, and a second optical subsystem coupled to the reference arm and the first optical subsystem to generate interference fringes between the collected backscattered radiation and the radiation delivered to the reference arm; and a data collection and processing system in communication with the interferometer configured to compute the optical path depth of the sample from the received interference fringes.

In some embodiments of the apparatus, the electromagnetic radiation source may include a frequency comb source. In various embodiments of the apparatus, the frequency comb source may generate a first frequency comb having a first free spectral range (FSR) and a second frequency comb having a second FSR different from the first FSR. In certain embodiments of the apparatus, the data collection and processing system may be configured to: obtain a first set of interferometric data using the first frequency comb, obtain a second set of interferometric data using the second frequency comb, determine a phase shift between the first set of interferometric data and the second set of interferometric data, and determine the optical path depth of the sample based on the phase shift.

In particular embodiments of the apparatus, the frequency comb source may include a degenerate frequency comb source. In some embodiments of the apparatus, the degenerate frequency comb source may include a chirped frequency comb source. In various embodiments of the apparatus, the data collection and processing system may be configured to: analyze the interference fringes to generate a first point-spread function (PSF) and a second PSF, calculate a shift between the first PSF and the second PSF, and determine the optical path depth within the sample based on the shift. In some embodiments of the apparatus, the frequency comb source may include a stepped frequency comb having a free spectral range, the frequency comb may include a plurality of frequency comb lines, and the frequency comb lines may be modulated by a particular amount to generate a change in frequency. In certain embodiments of the apparatus, the data collection and processing system may be configured to: obtain a first set of interferometric data without modulation of the frequency comb lines, obtain a second set of interferometric data with modulation of the frequency comb lines, determine a phase shift between the first set of interferometric data and the second set of interferometric data caused by modulation of the frequency comb lines, and determine the optical path depth of the sample based on the phase shift.

In certain embodiments of the apparatus, the electromagnetic radiation source further may include a continuously swept source, and the data collection and processing system may be configured to: obtain a first set of interferometric data using the frequency comb source, obtain a second set of interferometric data using the continuously swept source, determine a swept source optical path depth within the sample based on the second set of interferometric data, and determine the optical path depth of the sample based on referencing the swept source optical path depth to the first set of interferometric data.

In some embodiments of the apparatus, the electromagnetic radiation source may include a stretched-pulse active mode-locked laser. In various embodiments of the apparatus, the electromagnetic radiation source may include a dispersive Fabry-Perot etalon filter. In certain embodiments of the apparatus, the Fabry-Perot etalon filter may include a Si-wafer. In some embodiments of the apparatus, the first optical subsystem may include an optical circulator circuit to route the radiation to the sample and the backscattered radiation from the sample to optical waveguides. In various embodiments of the apparatus, the reference arm may include an active phase modulator to perform complex demodulation of the interference fringes. In certain embodiments of the apparatus, the data collection and processing system, when computing the optical path depth of the sample, may be further configured to compute a plurality of optical path delays of the sample corresponding to a plurality of optical path depths within the sample.

In some embodiments of the method, the electromagnetic radiation source may include a frequency comb source. Various embodiments of the method may further include generating, by the frequency comb source, a first frequency comb having a first free spectral range (FSR) and a second frequency comb having a second FSR different from the first FSR. Certain embodiments of the method may further include obtaining, by the data collection and processing system, a first set of interferometric data using the first frequency comb, obtaining, by the data collection and processing system, a second set of interferometric data using the second frequency comb, determining, by the data collection and processing system, a phase shift between the first set of interferometric data and the second set of interferometric data, and determining, by the data collection and processing system, the optical path depth of the sample based on the phase shift.

In some embodiments of the method, the frequency comb source may include a degenerate frequency comb source. In various embodiments of the method, the degenerate frequency comb source may include a chirped frequency comb source. Certain embodiments of the method may include analyzing, by the data collection and processing system, the interference fringes to generate a first point-spread function (PSF) and a second PSF, calculating, by the data collection and processing system, a shift between the first PSF and the second PSF, and determining, by the data collection and processing system, the optical path depth within the sample based on the shift.

In some embodiments of the method, the frequency comb source may include a stepped frequency comb having a free spectral range, and the frequency comb may include a plurality of frequency comb lines, and the method may further include modulating the frequency comb lines by a particular amount to generate a change in frequency. Particular embodiments of the method may further include obtaining, by the data collection and processing system, a first set of interferometric data without modulation of the frequency comb lines, obtaining, by the data collection and processing system, a second set of interferometric data with modulation of the frequency comb lines, determining, by the data collection and processing system, a phase shift between the first set of interferometric data and the second set of interferometric data caused by modulation of the frequency comb lines, and determining, by the data collection and processing system, the optical path depth of the sample based on the phase shift.

In certain embodiments of the method, the electromagnetic radiation source may further include a continuously swept source, and the method may further include obtaining, by the data collection and processing system, a first set of interferometric data using the frequency comb source, obtaining, by the data collection and processing system, a second set of interferometric data using the continuously swept source, determining, by the data collection and processing system, a swept source optical path depth within the sample based on the second set of interferometric data, and determining, by the data collection and processing system, the optical path depth of the sample based on referencing the swept source optical path depth to the first set of interferometric data.

In various embodiments of the method, the electromagnetic radiation source may include a stretched-pulse active mode-locked laser. In certain embodiments of the method, the electromagnetic radiation source may include a dispersive Fabry-Perot etalon filter. In some embodiments of the method, the Fabry-Perot etalon filter may include a Si-wafer. In particular embodiments of the method, the first optical subsystem may include an optical circulator circuit to route the radiation to the sample and the backscattered radiation from the sample to optical waveguides. In some embodiments of the method, the reference arm may include an active phase modulator to perform complex demodulation of the interference fringes. In various embodiments of the method, computing the optical path depth of the sample may further include computing a plurality of optical path delays of the sample corresponding to a plurality of optical path depths within the sample.

In another embodiment, the invention provides a method, including: producing, by an electromagnetic radiation source, radiation for illuminating a sample located at an optical path depth, the electromagnetic radiation source providing the radiation to the sample to facilitate determining the optical path depth within the sample; delivering, by the electromagnetic radiation source, a first portion of the radiation to a reference arm of an interferometer; delivering, by the electromagnetic radiation source, a second portion of the radiation to a sample arm of the interferometer; interrogating, by a first optical subsystem coupled to the sample arm, the sample with the radiation delivered to the sample arm to generate backscattered radiation; collecting, by the first optical subsystem, the backscattered radiation from the sample, generating, by a second optical subsystem coupled to the reference arm and the first optical subsystem, interference fringes between the collected backscattered radiation and the radiation delivered to the reference arm; and computing, by a data collection and processing system in communication with the interferometer, the optical path depth of the sample from the received interference fringes.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

(FIG. 1A) a non-degenerate frequency comb source, and (FIG. 1B) a degenerate (chirped) frequency comb source. ZPL=zero pathlength.

FIG. 3A shows simulated mirror signals for various set orders for a degenerate frequency comb spectrum centered at 1290 nm with 100 nm bandwidth. FIG. 3B shows superimposed mirror signals from the blue ($S_b$, centered at 1265 nm) and red (centered at 1315 nm, $S_r$) as a function of set order. FIG. 3C shows a CR A-line showing the blue and red band point spread functions (PSFs) and their walk-off at the −9th set order. FIG. 3D shows an extracted PSF width before and after correcting for the degenerate frequency comb chirp using the recovered order parameter and $D=0.54\times10^{-3}$ $ps^2$.

FIG. 4A shows the PSF calculated from the full spectrum. FIG. 4B shows superimposed PSFs from the blue and red sub-bands. FIG. 4C shows a PSF as in FIG. 4A after dechirping using the calculated order parameter and $D=0.54\times10^{-3}$ $ps^2$. FIG. 4D shows the measured PSF widths before (red, squares) and after (black, circles) dechirping as a function of set order.

FIG. 5A shows a photograph (upper portion of FIG. 5A) and intensity depth projection (lower portion of FIG. 5A). FIG. 5B shows a circular depth map corresponding to the lower portion of FIG. 5A. FIG. 5C shows a reconstructed absolute depth corresponding to the lower portion of FIG. 5A.

DETAILED DESCRIPTION

Figure 1A:
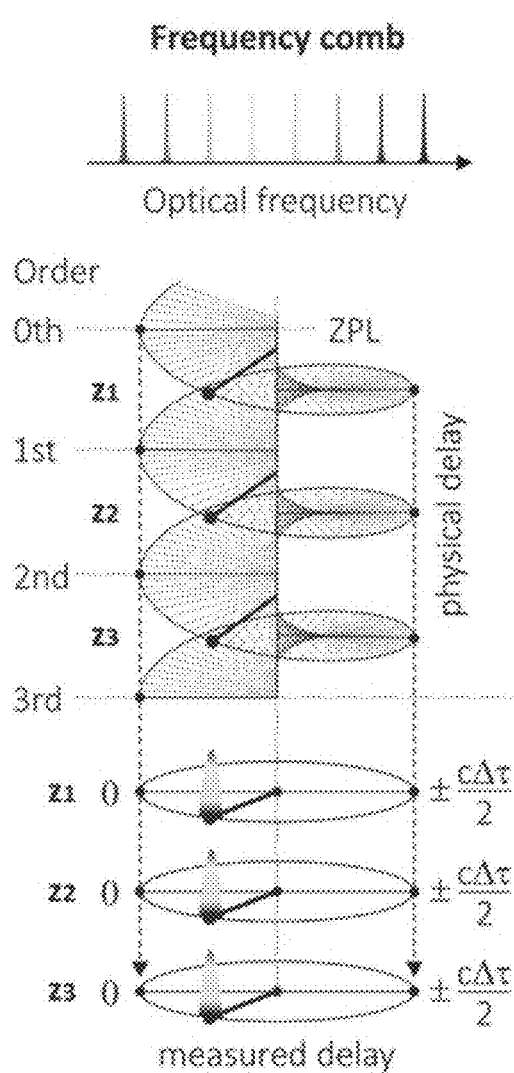
FIGS. 1A and 1B show a comparison of the mapping between physical and measured CR-OCT using.

In accordance with some embodiments of the disclosed subject matter, mechanisms (which can include systems, methods, and media) for resolving absolute depth in circular-ranging optical coherence tomography are provided.

Subsampled OCT is an imaging technology capable of operating at providing high speeds and operating over long ranges. It achieves this by performing an optical-domain compression of the generated interference signals through the use of optical subsampling. Traditionally, this has been achieved by using a frequency comb source, i.e. a source that includes individual spectral lines that are equi-spaced in optical frequency.

One potential disadvantage of subsampled OCT is that the absolute delay (and therefore location) of the sample is not measured. Instead, the relative location of sample features are measured. In this invention, methods and apparatus are presented to provide both compression and absolute delay/position sensing. In certain embodiments, this may be based on using an imperfect (or degenerate) frequency comb, i.e. one with spectral lines that are purposely not arranged on an equi-spaced grid in optical frequency. This approach may be used in a number of different applications, including any application of subsampled OCT for which there is additional value in knowing the absolute position of the samples. This can be used for example to measure the distance between a surgical instrument and a tissue sample, or to measure the topography of the sample. The later could be used in diverse fields such as performing a dynamic autofocusing, for example.

In Fourier-domain optical coherence tomography, an interference signal is generated which spans an RF bandwidth proportional to the product of three parameters: the imaging range, the imaging speed, and the inverse of the axial resolution. Circular ranging (CR) OCT architectures were introduced to ease long-range imaging by decoupling imaging range from signal RF bandwidth. As a consequence, present CR-OCT systems resolve the relative, but not the absolute, depth location of the scatters. Introduced here is a modified implementation of CR-OCT which, in certain embodiments, uses a degenerate frequency comb source that allows recovery of absolute depth information while only minimally impacting the previously described RF bandwidth compression benefits of CR. It is shown that this degenerate frequency comb can be created by relatively simple modifications to exciting frequency comb source designs, and absolute ranging capabilities are presented through imaging studies and simulations.

In Fourier-domain optical coherence tomography, an acquisition system with finite electronic bandwidth is used to capture the generated optical signals. In applications that require long depth ranges relative to the 1-2 mm imaging depth of OCT into most samples, a large portion of the acquired signal bandwidth is dedicated to the measurement of the signal-void regions that are located prior to the sample surface or past the deepest imageable depth. CR-OCT captures these signals with higher data efficiency by overlapping equally spaced depth points into a single measurement depth. This is done in the optical-domain such that the electronic acquisition can operate at a reduced bandwidth and with less noise. As such, CR-OCT decouples imaging range and acquisition bandwidth, making simultaneous high-speed and long-range imaging more practical.

The CR-OCT technique is illustrated in FIG. 1A, demonstrating the circular mapping of a physical delay coordinate (z-axis) into a measured circular delay coordinate (xy-plane). Note that each measured delay is a superposition of a set of equally spaced physical delays. This spacing is termed the circular delay range. Importantly, it can be appreciated from this illustration that a distribution of reflected signals only spanning a delay range that is less than the circular delay range can be resolved in the measured/circular delay space without overlapping artifacts. A frequency comb source in combination with complex (in-phase and quadrature) detection of interference fringes leads to circular ranging, and the circular delay range is proportional to the inverse of the free spectral range (FSR) of the frequency comb source, $\Delta\tau=1/(2fsr)$. For convenience, a corresponding circular depth range can be defined that is the product of the circular delay range and the speed of light in the imaged material. It is noted that the term delay in this work is always defined in relation to the reference arm delay.

One consequence of the circular mapping shown in FIG. 1A is that the absolute delay of the sample is not measured. In this work, a method is presented for resolving absolute delay in CR-OCT. Absolute ranging is achieved by adopting a degenerate frequency comb, i.e., a frequency comb with unequally-spaced optical frequency lines. It is specifically demonstrated that a chirped-frequency degenerate comb source allows measurement of absolute position while maintaining a high compression factor (the core motivation underlying CR-OCT). Further, it is demonstrated that it is straightforward to modify existing CR-OCT sources to generate the degenerate comb output.

As a starting point, it is instructive to consider a simple approach to resolving the absolute delay in a CR-OCT system using a "dual-FSR" approach. Here, a first measurement is considered using a first frequency comb source with a given FSR, $fsr_1$. A given signal can then be localized in delay subject to an unknown integer number of cycles (termed order) of the corresponding circular delay range $[\Delta\tau=1/(2fsr_1)]$. If a second measurement of the same sample is acquired with a different FSR, $fsr_2$, the signal may appear at a different circular delay depending on its absolute position. Thus, by measuring the relationship between the measured circular delay using each of $fsr_1$ and $fsr_2$, it is possible to retrieve the integer order parameter in each of the measurements, and thereby the absolute delay. This can be analogized to the measurement of the elapsed time of an event using a stopwatch with a seconds-hand but no minutes-hand. A single stopwatch cannot distinguish between, for example, an elapsed time of 17 s and 1 m 17 s. By adding a second stopwatch that runs faster than the original stopwatch by a known amount, the difference between the seconds-hand measurements of the two watches can now be used to calculate the minutes (that is, the order).

While straightforward to understand, the dual-FSR approach may have disadvantages, at least for certain applications. First, generating two frequency combs with distinct FSRs is possible, although it may complicate the overall source module; for example, this could be done using two frequency comb sources to illuminate the sample simultaneously or successively, or by using a single frequency comb source where the free spectral range can be adjusted (altered) between images or A-lines. Second, collection of two A-lines is required to add the absolute depth measurement, which doubles the number of measurements and decreases the efficiency/compression advantage of the CR approach. Nevertheless, for certain applications this tradeoff of a more complicated source and a somewhat slower acquisition rate in exchange for absolute depth information may be considered acceptable.

Figure 1B:
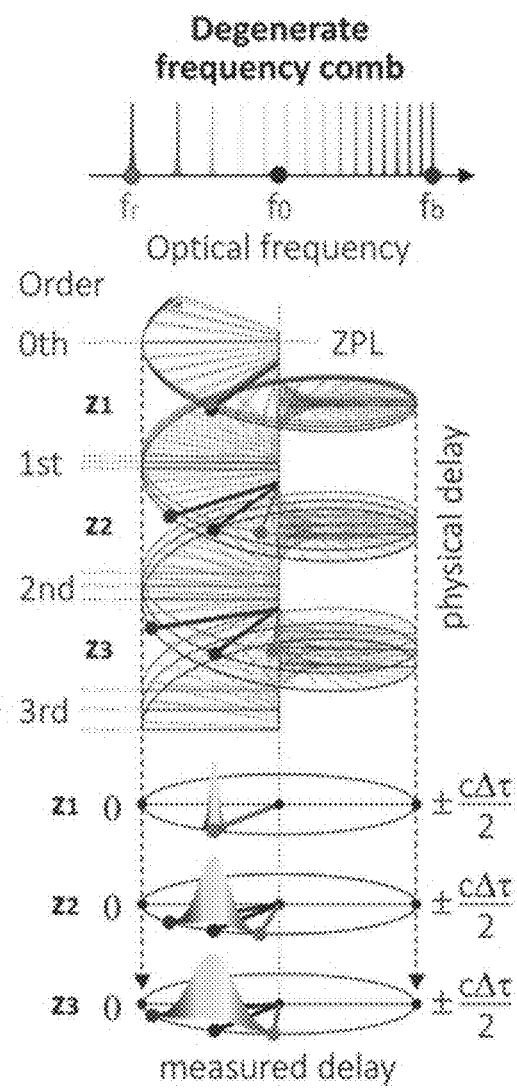

This work demonstrates an implementation based on similar principles but with a simpler source implementation and minimally reduced compression penalty. Rather than using two distinct FSRs, a frequency comb is used which has a continuously chirped FSR, i.e., a degenerate frequency comb (DFC). The principle of this approach is similar to that of the dual FSR described above, i.e. that the variation in FSR across optical frequency provides clocks with varying speeds that can be used to decipher the absolute delay. However, the information is now contained within a single depth measurement (A-line). Additionally, the chirped FSR can be created by simply using a dispersive Fabry-Perot etalon within the laser source, $fsr(\omega)=c/(2n_g(\omega)l)$, where $\omega$ is the angular optical frequency, $n_g$ is the group refractive index of the etalon, l is the etalon thickness and c the speed of light. FIGS. 1A and 1B compare the absolute-to-measured delay mapping of the proposed approach (FIG. 1B) relative to the conventional single FSR CR-OCT approach (FIG. 1A). By using a degenerate frequency comb, the spiral mapping of physical delay to measured delay becomes dependent on the optical frequency and thus yields a chirp shown in illustration for three discrete optical frequencies and three delays in FIG. 1B. The dispersion in the spectrally resolved circular delays (now dependent on optical frequency) is used to calculate the absolute delay. Then, with knowledge of the absolute delay of the scattering signals, it is possible to dechirp the measured fringe such that an image can be generated which is resolved across absolute delay and which has transform-limited axial resolution.

Figure 2A:
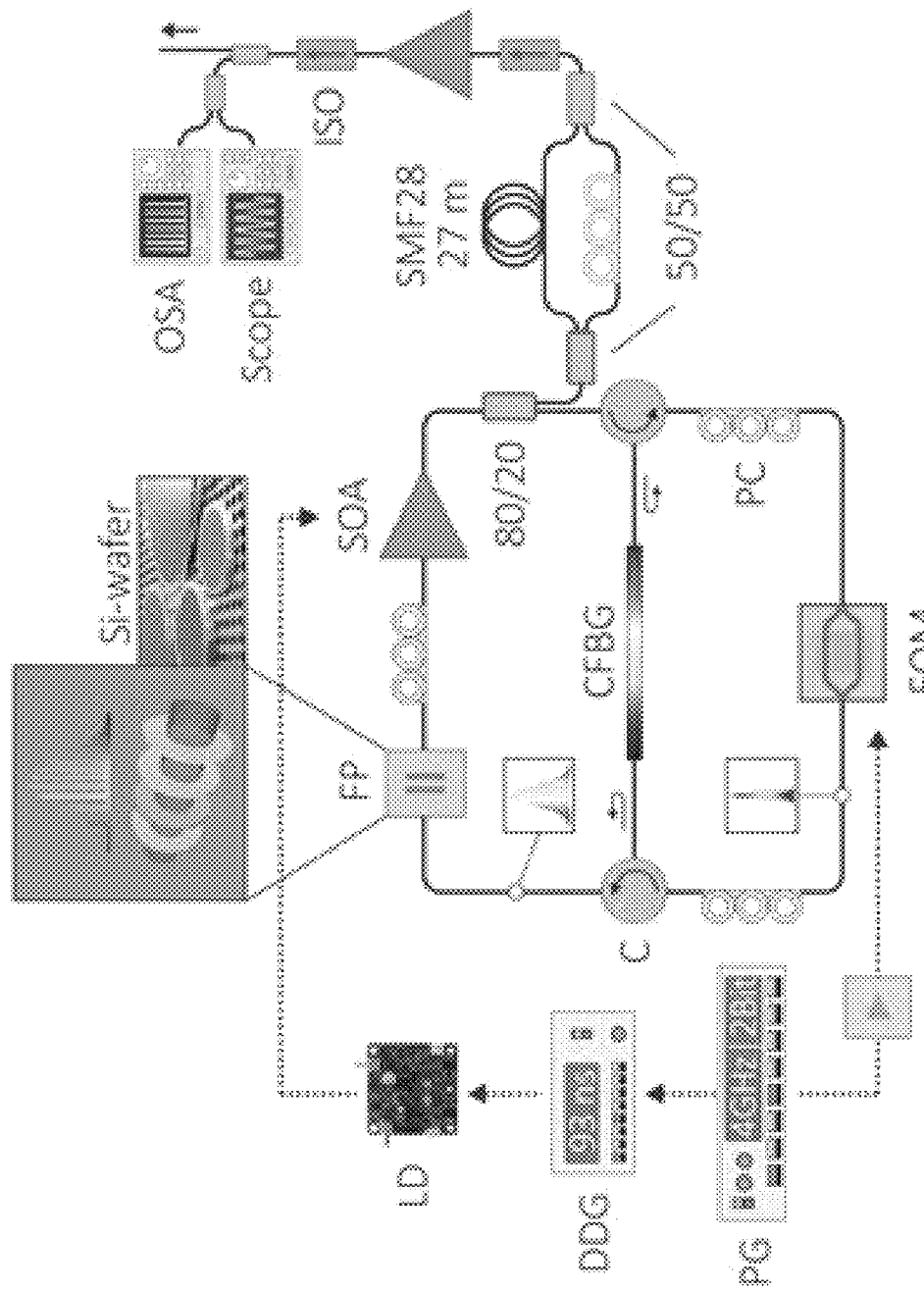
FIG. 2A shows an experimental CR-OCT setup showing the SPML laser with a degenerate frequency comb output. The Fresnel reflection of the Si-etalon produced a finesse of 2.1 per etalon, and a combined finesse of 5.1 after four etalons. LD, laser diode driver; DDG, digital delay generator; PG, pattern generator; A, amplifier; EOM, electro-optical modulator; PC, polarization controller; CFBG, continuous fiber Bragg grating; SOA, semiconductor optical amplifier; FP, Fabry-Perot etalon spectral filter; OSA, optical spectrum analyzer; ISO, optical isolator; PG, signal generator. Si-wafer photograph included with permission from WaferPro.
Figure 2B:
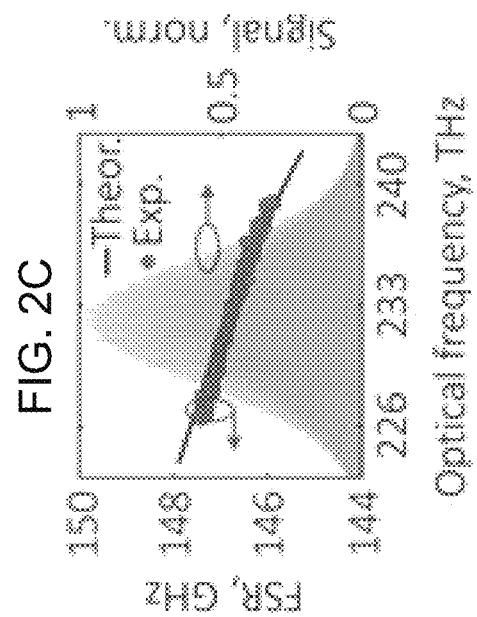
FIG. 2B shows a measured etalon transmission at 232.5 THz for 1 (green line), 2 (red line) and 4 (blue line) Si wafer in series.
Figure 2C:
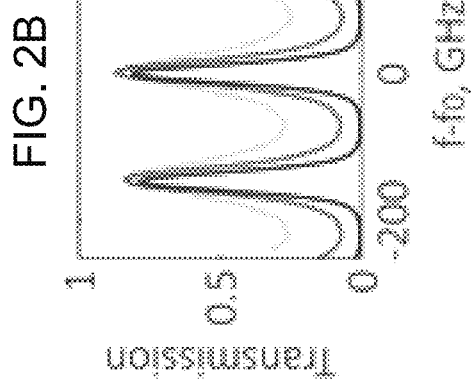
FIG. 2C shows an etalon FSR across the spectrum. The red points show experimental data and the blue line shows the theoretical curve.
Figure 2D:
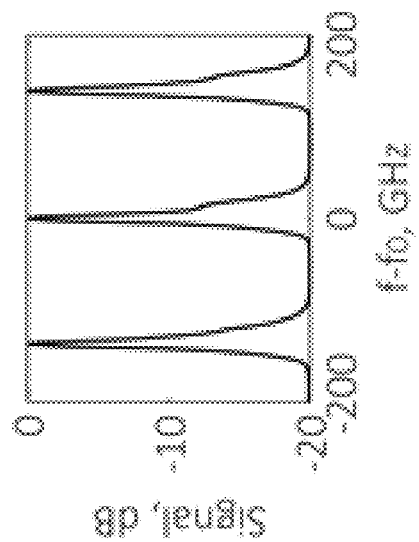
FIG. 2D shows a degenerate frequency comb spectrum at the SPML output.
Figure 2E:
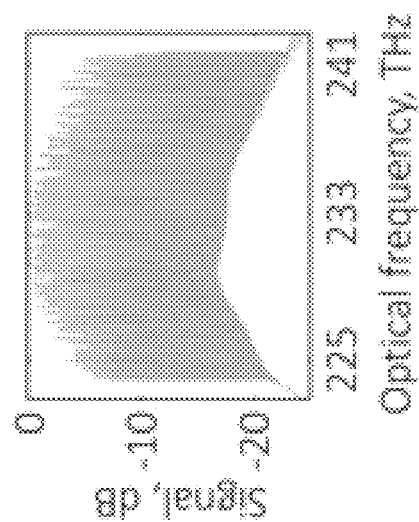
FIG. 2E shows a magnified plot of three comb lines at the SPML output.

In various embodiments, a CR-OCT system may be implemented using a degenerate frequency comb by placing a dispersive Fabry-Perot etalon within a stretched-pulse active mode-locked (SPML) laser architecture at 1.29 µm (FIG. 2A). The DFC-SPML had a sweep speed of 194 THz/µs and a repetition rate of 7.6 MHz at 76% duty cycle. Silicon (Si) wafers providing a group velocity dispersion of approximately 1750 ps²/km at 1.3 µm were used as etalons. The 280 µm thick wafer offered a FSR of 146.7 GHz at the center optical frequency, providing a circular depth range of approximately 1 mm in air. The single pass transmission and frequency dependent FSR is shown in FIGS. 2B and 2C. The spectrum at the DFC-SPML output and a magnified plot of three comb lines is shown in FIGS. 2D and 2E. The coherence length of the source was measured to be approximately 2 cm (two-sided FWHM around zero pathlength). This source in combination with a simple interferometer and acquisition system provided measured fringe signals. Complex demodulation of the fringe signals was implemented using an active (LiNbO₃) phase modulator in the reference arm.

Figure 3A:
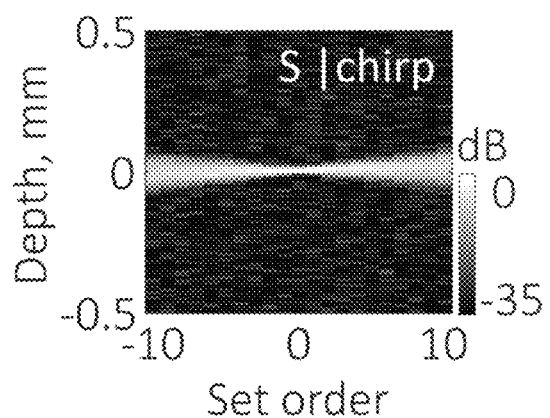
FIGS. 3A-3D show a numerical simulation of CR depth signals using a degenerate frequency comb and dispersive Si-etalon.
Figure 3B:
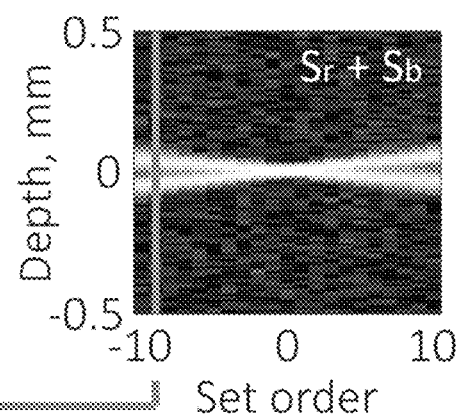
Figure 3C:
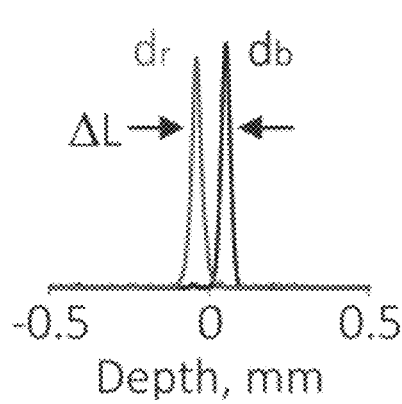

A numerical forward model of CR-OCT fringe signals was generated from the aforementioned system, i.e., with the same optical source properties and interferometer design. Using this model, a processing pipeline was constructed and validated to extract absolute depth information from mirror fringe signals. As a starting point, FIG. 3A presents the simulated point spread functions (PSFs) for a mirror signal generated by processing the degenerate frequency comb signals using conventional CR-OCT approaches. A mirror was located at the same circular depth (0 mm), but at different orders of the circular depth range (where the circular depth range is defined by the mean FSR of the DFC). Here, the expected chirp (blurring) of the PSF due to the use of the degenerate frequency comb can be seen. Next, a dual-band processing approach was implemented which analyzed detected fringes separately in separate bands referred to herein as "blue" and "red" spectral bands, centered at 1265 nm (237.2 THz) and 1315 nm (228.1 THz), respectively. The difference in the mean FSR within each band was approximately $\Delta$=1.3 GHz, with $fsr_r$>$fsr_b$ ($\Delta\tau_r$<$\Delta\tau_b$). The simulated PSFs for the same mirror positions are plotted in FIG. 3B. Here, the overall chirp of FIG. 3A can be resolved into two PSFs that are walking-off from each other. With the measured depth shift, $\Delta L$, between the blue- and red-band PSFs (FIG. 3C), the order parameter, k, is calculated by $$\Delta L(k) = \frac{kc}{2}\left(\frac{1}{fsr_b} - \frac{1}{fsr_r}\right) \quad (1)$$

where $fsr_{b,r}$ is the mean FSR across the blue and red band, respectively.

Figure 3D:
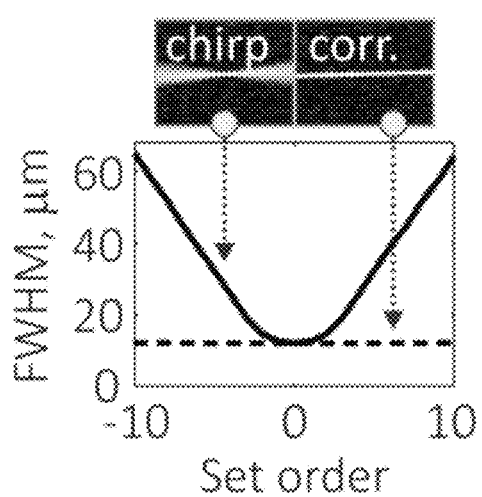

Next, a technique was developed to eliminate the chirp (axial blurring) resulting from the use of the degenerate frequency comb (see FIG. 3A). A corrected fringe signal, s'($\omega_i$), is calculated by multiplying the measured complex fringe, s($\omega_i$), and a correction vector given by exp [iDk($\omega-\omega_0$)$^2$)] where k is the integer depth order parameter (FIG. 3D). The parameter D is given by the properties of the degenerate frequency comb as $$D = -\frac{1}{2fsr^2(\omega_0)}\frac{dfsr(\omega)}{d\omega}\bigg|_{\omega=\omega_0'} \quad (2)$$

Figure 4A:
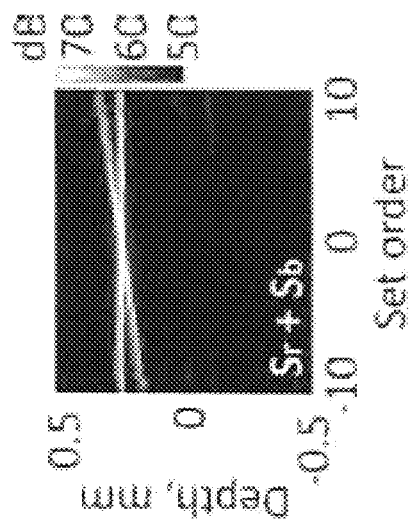
FIGS. 4A-4D show experimental implementation of absolute delay ranging using a degenerate frequency comb.
Figure 4B:
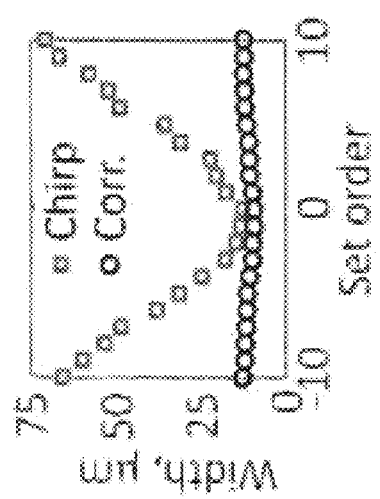
Figure 4C:
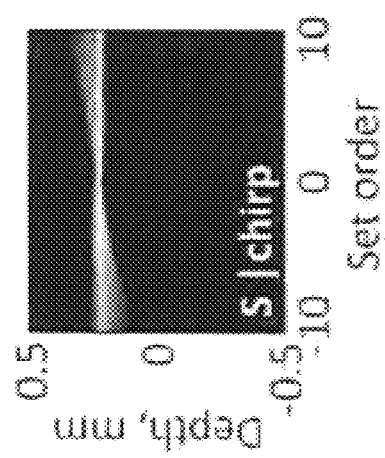
Figure 4D:
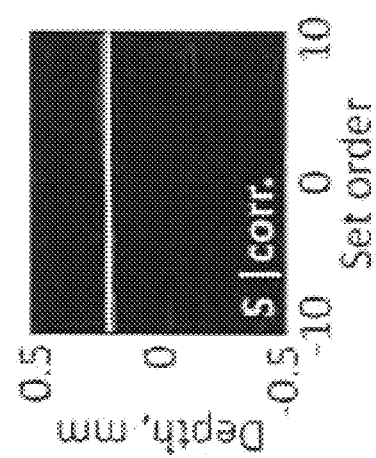

This processing pipeline was then applied to experimental data. FIG. 4 shows PSF measurements at a circular depth of approximately 250 µm using the degenerate frequency comb for order parameters ranging between ±10 acquired analogously to the simulated data in FIG. 3. FIGS. 4A and 4B show the PSFs when using the full band and the red/blue spectral bands, respectively. The PSF walk-off was extracted by A-line cross-correlation. It is noted that in practice, PSF wrapping at the circular depth range edges must be considered. At these boundaries, the true PSF shift is given by the measured shift, $\Delta$L', and the blue-band circular depth range (because fsr$_r$>fsr$_b$), $\Delta L = \Delta L' \pm c\,\Delta\tau_b$. It was confirmed that the order calculated from the measured PSF shift in FIG. 4B matched the set order for each measurement (set order from −10 to 10). Using this resolved order parameter, the chirp (broadening) of the full spectral data was corrected as described by Eq. 1 and generated a dechirped PSF (FIG. 4C). The recovered PSF width before and after correction is presented in FIG. 4D. Due to PSF asymmetry, the root-mean-square width $\delta z_{rms} = (\Sigma((d-d_0)^2 S)/\Sigma S)^{-1/2}$ was adapted here, where d is depth, $d_0$ is the PSF center depth and S is the signal magnitude.

Figure 5C:
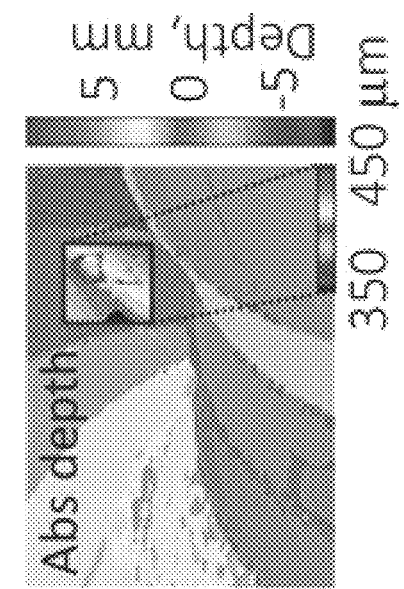
FIGS. 5A-5C show absolute height topographical imaging of a stack of US pennies using the proposed CR-OCT system.
Figure 5B:
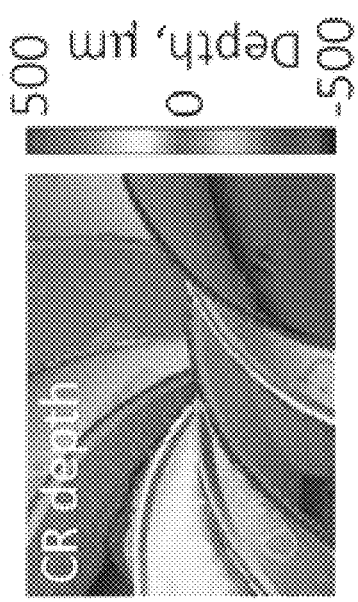
Figure 5A:
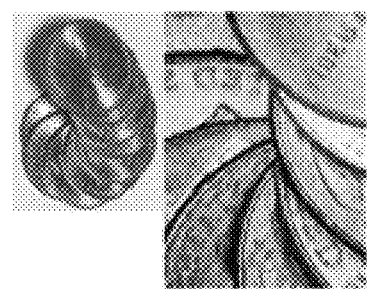

To test the reconstruction of absolute depth information from a sample, a stack of 9 US pennies was imaged (FIG. 5A). Circularly wrapped and absolute topographic images are shown in FIGS. 5B and 5C, respectively. Note that the absolute image spans a much larger depth range but retains the same height resolution (given by the axial resolution) as the conventional circularly wrapped image depth range. Errors in the measured height are believed to originate from low measurement SNR; a study of SNR requirements and noise mitigation strategies in absolute delay resolved CR-OCT is ongoing and beyond the scope of this work.

Figure 6:
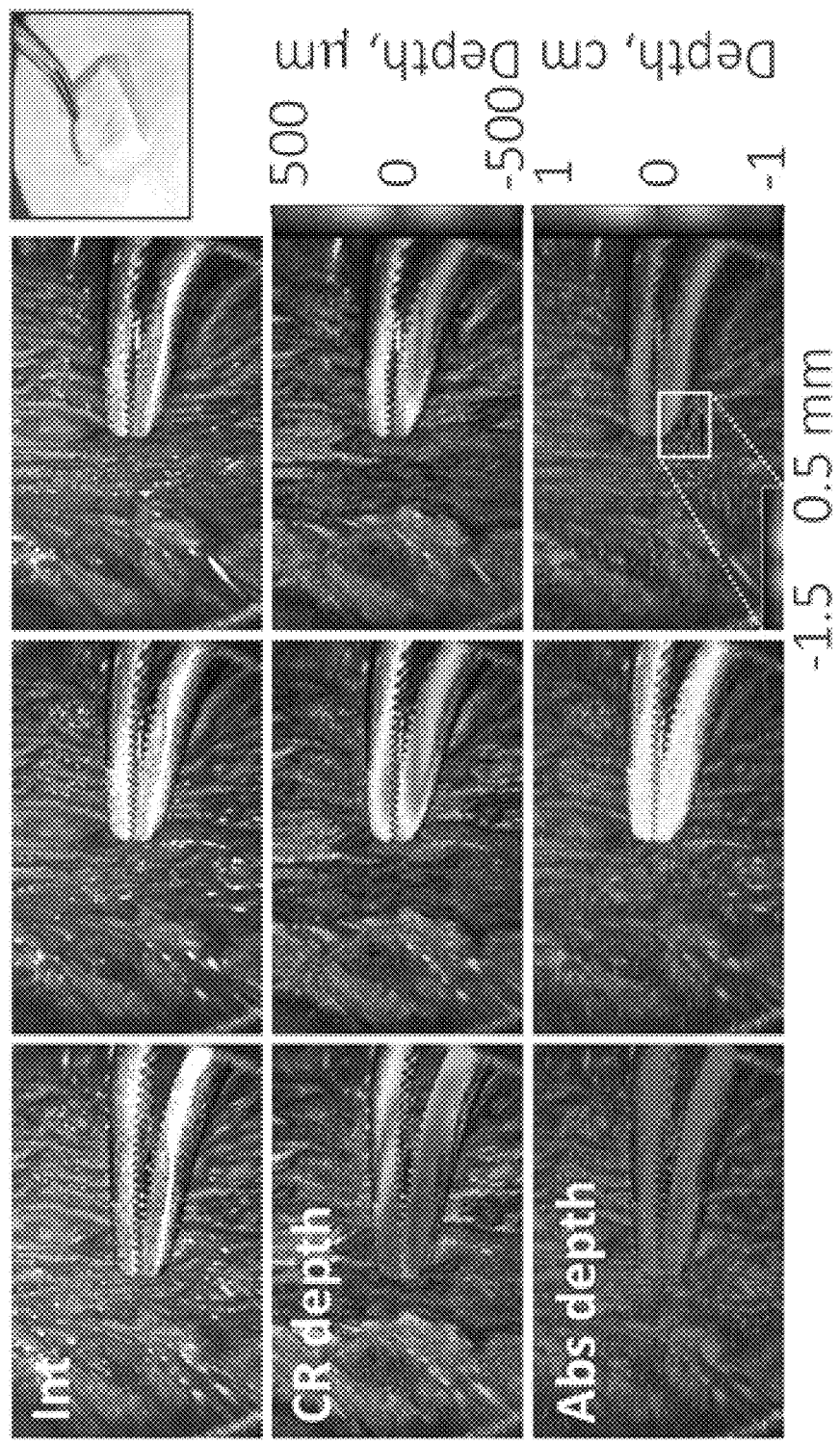
FIG. 6 shows images depicting resolving of the absolute position of a surgical instrument using the proposed CR-OCT system. Surgical forceps were positioned above a tissue (chicken skin) sample. Images depict en-face intensity projections (top row), circular depth maps (middle row), and recovered absolute depth maps (bottom row), where the color/shading scale depicts depths (see scales on the right side of the middle and bottom rows).

In a second experiment, the technique was used to provide feedback on the absolute positioning of a surgical instrument relative to a tissue surface (FIG. 6). FIG. 6 shows images depicting resolving of the absolute position of a surgical instrument using the proposed CR-OCT system. Surgical forceps were positioned above a tissue (chicken skin) sample. Images depict en-face intensity projections (top row), circular depth maps (middle row), and recovered absolute depth maps (bottom row), where the color/shading scale depicts depths (see scales on the right side of the middle and bottom rows). The absolute topographic images (bottom row) but not the circularly wrapped conventional CR topographic images (middle row) allow the proximity of the instrument to the tissue to be measured. This absolute depth mapping technique could enable applications such as surgical guidance with high depth perception where visualizing complex organs within a surgical field during a procedure would benefit from real-time stereo vision.

Finally, brief comments on the magnitude of etalon dispersion required to perform absolute ranging are provided. Again returning to the dual FSR technique as a simplified example, the minimum FSR difference, $\Delta_{min}$, required to generate a detectable shift by setting $\Delta L = \delta_z$ for k=1 in Eq. 1 can be estimated, where $\delta z$ is the transform limited axial resolution of each measurement, yielding $$\Delta_{min} = \frac{2\delta z \overline{fsr}^2}{2\delta z \overline{fsr} + c}, \quad (3)$$

where $\overline{fsr}$ is the mean FSR between the measurements. Applying this to the degenerate frequency comb technique presented in this work, one can set $\overline{fsr} = (fsr_b + fsr_r)/2$ and bz equal to the transform limited axial resolution of each sub-band. To estimate a maximum differential FSR, $\Delta_{max}$, it is noted that the shift, $\Delta$L, induced by a sample located in the largest order a system is designed to measure accurately, $k_{max}$, should not exceed half of the circular delay range ($c\Delta\tau_r/2$), $$\Delta_{max} < \frac{\overline{fsr}}{1+2k_{max}}, \quad (4)$$

where $k_{max} = l_c/(2\,\Delta L_{k=1})$, with $l_c$ being the coherence length and $\Delta L_{k=1}$ being $\Delta$L for k=1, i.e., the difference in the circular depth range. It is noted that this limit can be overcome in the degenerate frequency comb method by shifting the spectral windows closer to the center frequency and thereby reducing the differential FSR between the measurements.

This work described and validates, both numerically and experimentally, that a degenerate frequency comb constructed from a dispersive Fabry-Perot etalon can be used to recover absolute delay positions without significantly affecting measurement compression. The current work focuses on the principles and first-order implementations, and as such has a few limitations. First, uncoated Si-etalons (Si-wafer) were used and, due to a resulting low finesse, multiple etalons were cascaded. A custom-designed coated Si (or other dispersive material) etalon providing higher finesse values would improve system performance, including coherence length and measurement SNR. The processing approach used simple red/blue sub-band analysis and PSF shift measurements based on cross-correlation. It is likely that this can be enhanced to better utilize the continuous chirping that occurs through the spectral band. Related to this, the construction of absolute delay resolving algorithms that impose a minimal processing penalty over conventional CR-OCT is critical and subject of ongoing studies.

In various embodiments the above procedures can be carried out using several different kinds of sources of electromagnetic radiation, although in some instances the procedures may be modified depending on the type of source that is used:

Dual-FSR

In some embodiments the source may be modified so as to produce frequency combs with two distinct FSRs, as in the "dual-FSR" approach disclosed above. With this approach, two A-lines are collected for each data point, one A-line for each of the two different FSRs, and the A-line data corresponding to the two FSRs is combined to determine the absolute depth.

Degenerate Frequency Comb

In embodiments such as those disclosed herein, a source which produces a degenerate frequency comb may be used to determine absolute depth. In addition to the embodiments disclosed above in which a dispersive etalon is used to create a degenerate (chirped) source, in other embodiments a prism or programmable lasers can alternatively be used to create a degenerate frequency comb. In various embodiments, the above-disclosed techniques for generating a degenerate frequency comb using an SPML laser can also be achieved using other types of laser sources such as a PCML, FDML, or traditional external cavity laser. Further, it is not necessary that the degenerate frequency comb created with any of the particular techniques be continuous.

Frequency Comb Line Modulation/Tuning/Shifting

In some embodiments, a source which generates a stepped frequency comb with a known FSR may be used in which the frequency comb lines are shifted, tuned, and/or modulated in the spectral domain by a known amount ($\Delta f$) using a frequency shifter, a phase modulator, etalon tilting, or other suitable means. For example, in some embodiments a frequency shifter or phase modulator may be located at the laser output before the interferometer. In other embodiments, etalon tilting may be implemented inside the laser cavity by tilting the spectral filter itself that produces the frequency comb (or changing the refractive index or other means). As with the dual-FSR approach discussed above, two A-lines (depth signals) are detected, obtained with and without the comb line shift/tuning/modulation.

Figure 7:
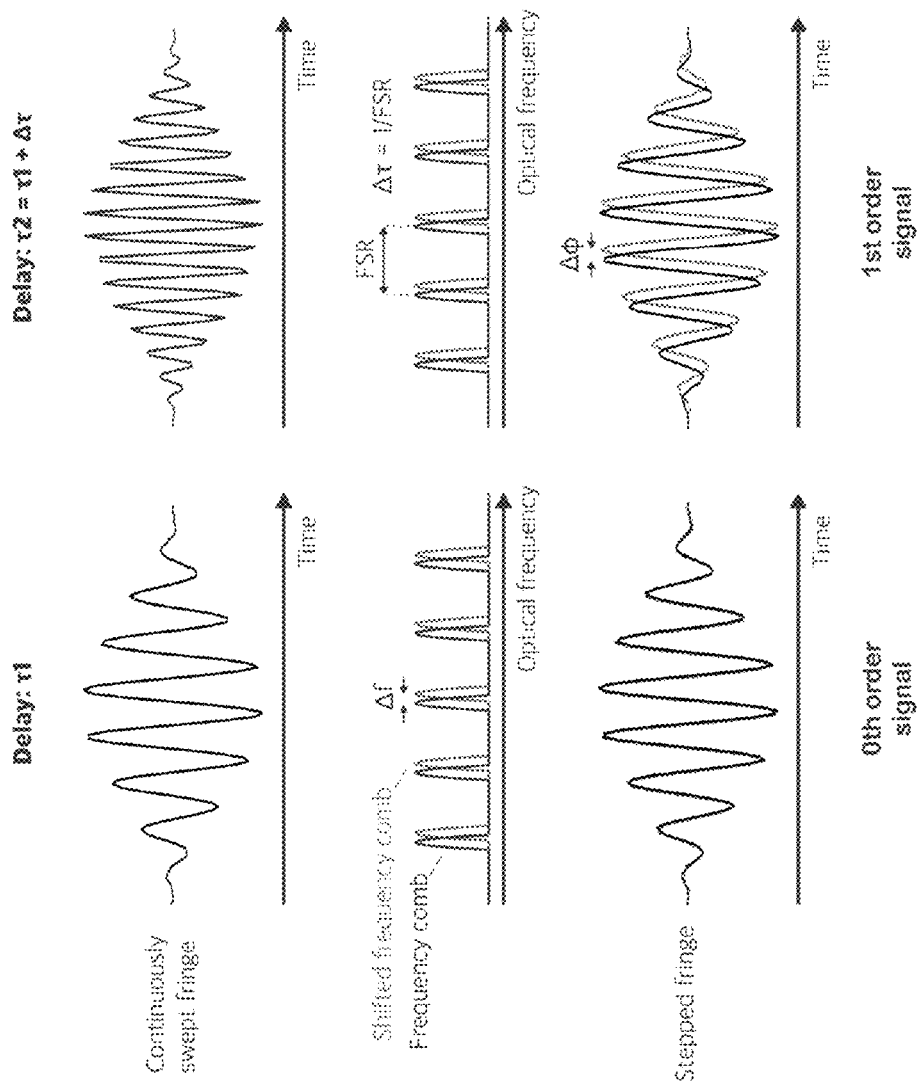
FIG. 7 shows fringe and frequency comb traces for a source in which the frequency comb is modulated, tuned, and/or shifted.

The comb line shift in the spectral domain yields an optical delay (T) dependent phase shift, $\Delta \varphi$, between the measured fringe signals (depth signals). FIG. 7 shows an example of a continuously swept fringe with two different delays, $\tau 1$ and $\tau 2$, in the time and optical frequency domains, where the frequency domain trace shows the shift in the frequency comb between the two delays. The measured phase shift, $\Delta \varphi$, can be seen in the stepped fringe in FIG. 7 and is used to solve for the absolute depth. The phase difference at the baseband edge is given by:

$$\Delta \phi_{LB} = \frac{\pi \Delta f}{FSR}$$

The absolute depth is determined by:

$$z = -\frac{\Delta \phi L_B}{2\pi} \frac{FSR}{\Delta f}$$

In general, the frequency shift $\Delta f$ must be small enough to avoid a phase ambiguity of the measured phase shift at the maximum targeted depth, $$N_k \Delta \phi_{L_B}/2 \leq \pi,$$

where $N_k$ is the number of orders within the coherence length.

Stepped Laser Plus Swept Laser

Figure 8:
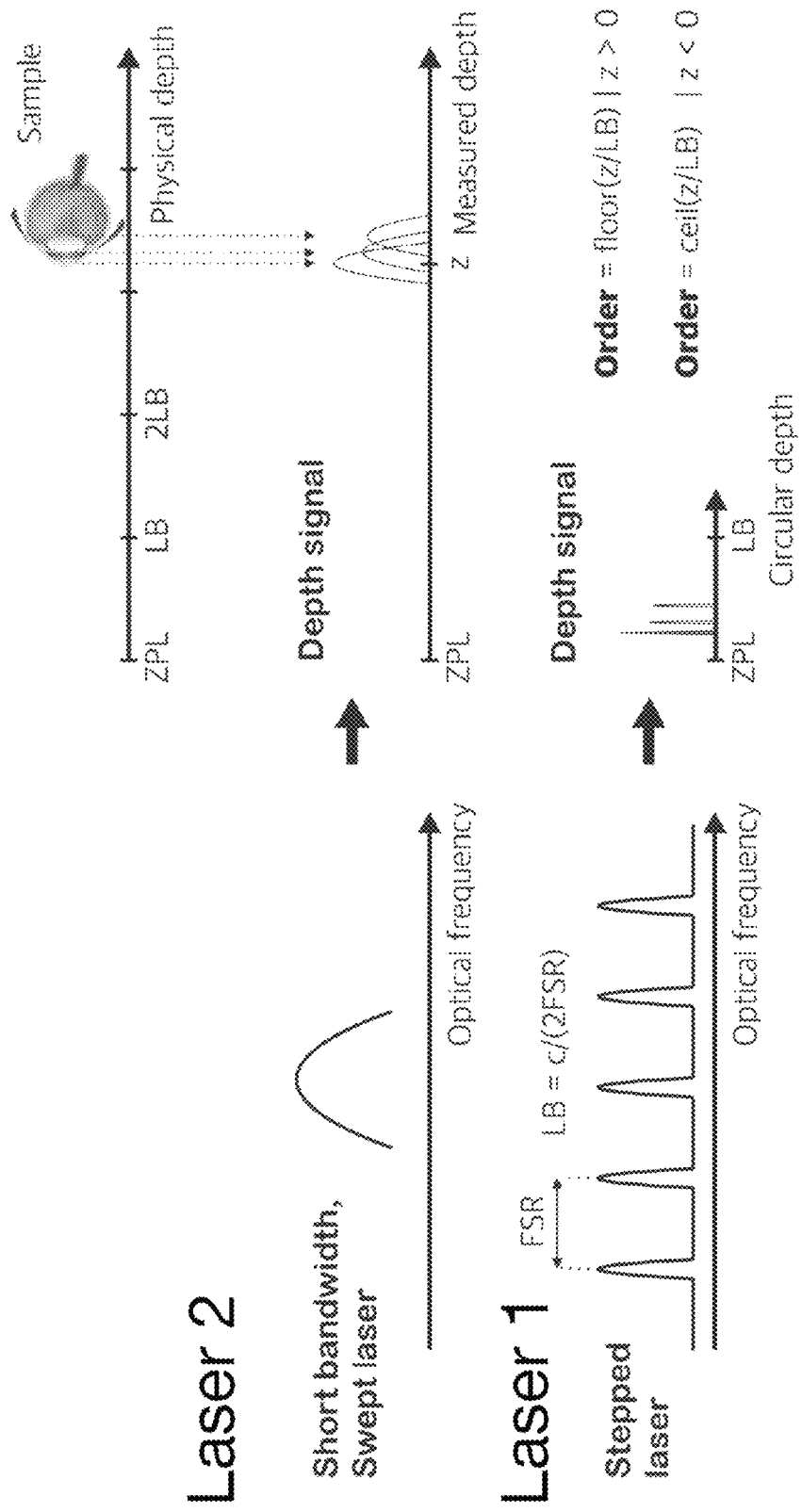
FIG. 8 shows determination of depth using a source that includes a stepped laser and a swept laser.

In some embodiments, a combination of a stepped laser source plus a swept laser source may be used to obtain absolute depth information from a sample. A stepped laser (Laser 1, FIG. 8) with a known FSR may be used to detect an A-line (depth signal) from the sample. As noted above, this generates a depth ambiguity about the circular range ($\Delta\tau=1/FSR$, $LB=c/FSR/2$) in the A-line that has been collected with Laser 1. To supplement this data, a narrow linewidth (long coherence length) continuously swept laser (Laser 2, FIG. 8) may be used to obtain a second A-line (depth signal) of the same sample (e.g. a cornea and/or lens as shown in FIG. 8, upper right). The relative depth (order) of the depth signal obtained may be referenced to the stepped laser (Laser 1) to the absolute depth obtained with the swept laser (Laser 2) to determine the absolute depth of the data obtained using the frequency comb of Laser 1.

In general, the axial resolution of Laser 2 should be half or better than the circular range (LB) of Laser 1. In addition, the optical bandwidth of Laser 2 should be kept minimal in order to maximize the sweeping speed of Laser 2; ideally, the A-line rate of Lasers 1 and 2 should be the same or very similar. Finally, the coherence length of Laser 2 should be equal to or better than the coherence length of Laser 1.

Figure 9:
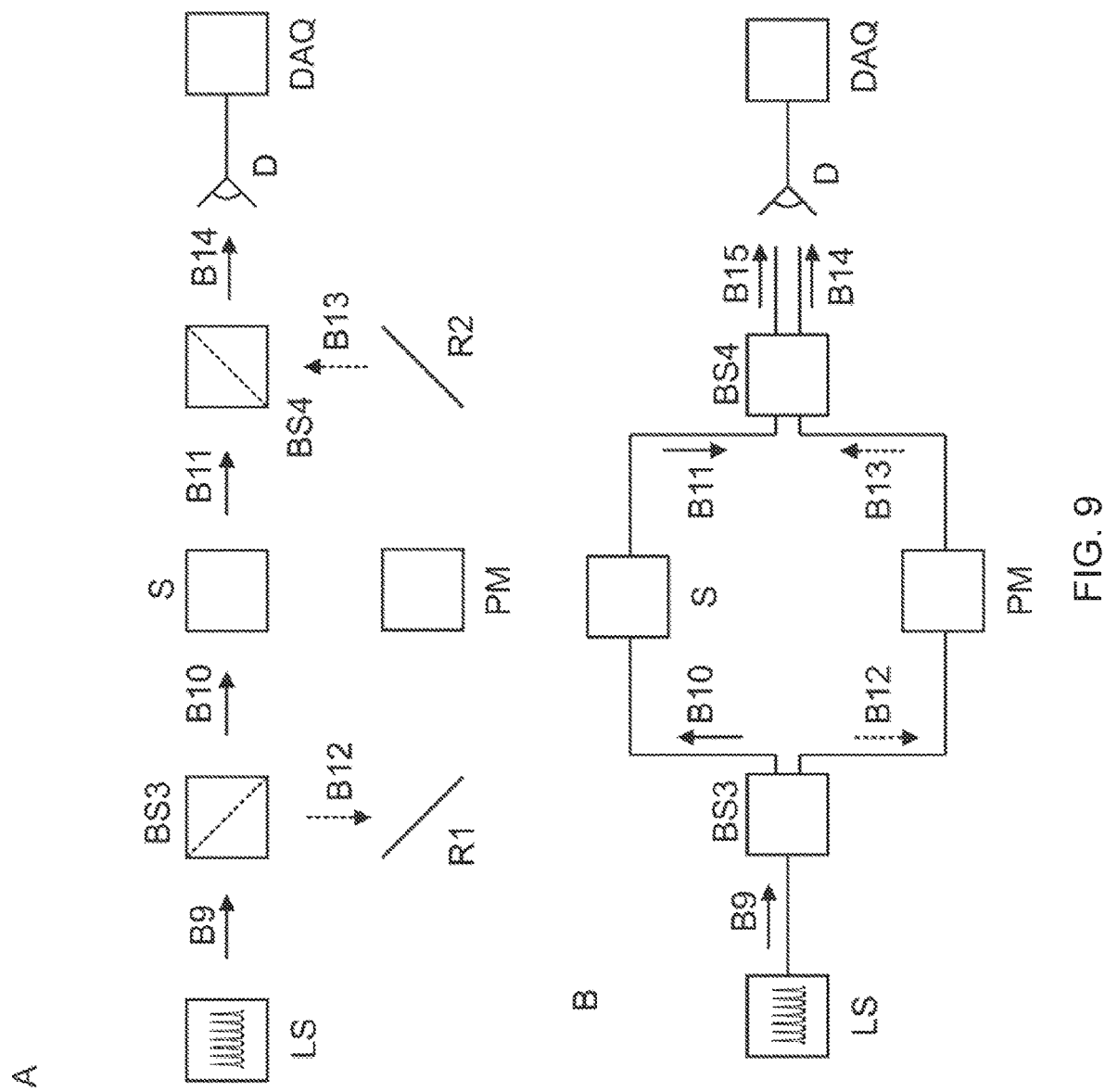
FIG. 9 provides diagrams of interferometry systems that may be used in conjunction with various embodiments disclosed herein.

FIG. 9 provides diagrams of interferometry systems that may be used in conjunction with various embodiments of the invention. FIG. 9 illustrates a Mach-Zehnder type interferometer that may be implemented using free space optics (FIG. 9, panel A) or a fiber arrangement (FIG. 9, panel B). Other interferometer types (e.g. Michelson) can also be applied. The light source LS in either panel A or panel B of FIG. 9 may be an SPML laser with a degenerate frequency comb as in FIG. 2 or other type of laser (e.g. PCML, FDML, or traditional external cavity laser); a source in which the lines of a stepped frequency comb are shifted, tuned, or modulated; a dual-FSR source; or a source which combines a stepped frequency comb with a swept laser.

Beam B9, emitted from LS, is directed to the interferometer input where it is split into two paths of approximately equal length using a beam splitter (BS3). B10 is directed towards a sample S. The backscattered light from the object of interest is then directed towards the interferometer output (B11). In the reference arm, beam B12 is directed towards a phase modulator (PM). The beam after the PM (i.e. beam B13) is directed to the interferometer output to interfere with beam B11 after being combined by BS4. The output beam B14 is then detected by a detector D (e.g. a photodiode). Alternatively, a fiber-based interferometer shown in FIG. 2B readily allows balanced detection due to a phase shift of a between output beams B14 and B15. The detected signal is digitized using data collection and processing system (which may include a data acquisition board or real time oscilloscope (DAQ)) at a sampling rate fs. Several wavelength sweeps (A1, A2, . . . , An) may be acquired to form a 2-dimensional or 3-dimensional image.

Figure 10:
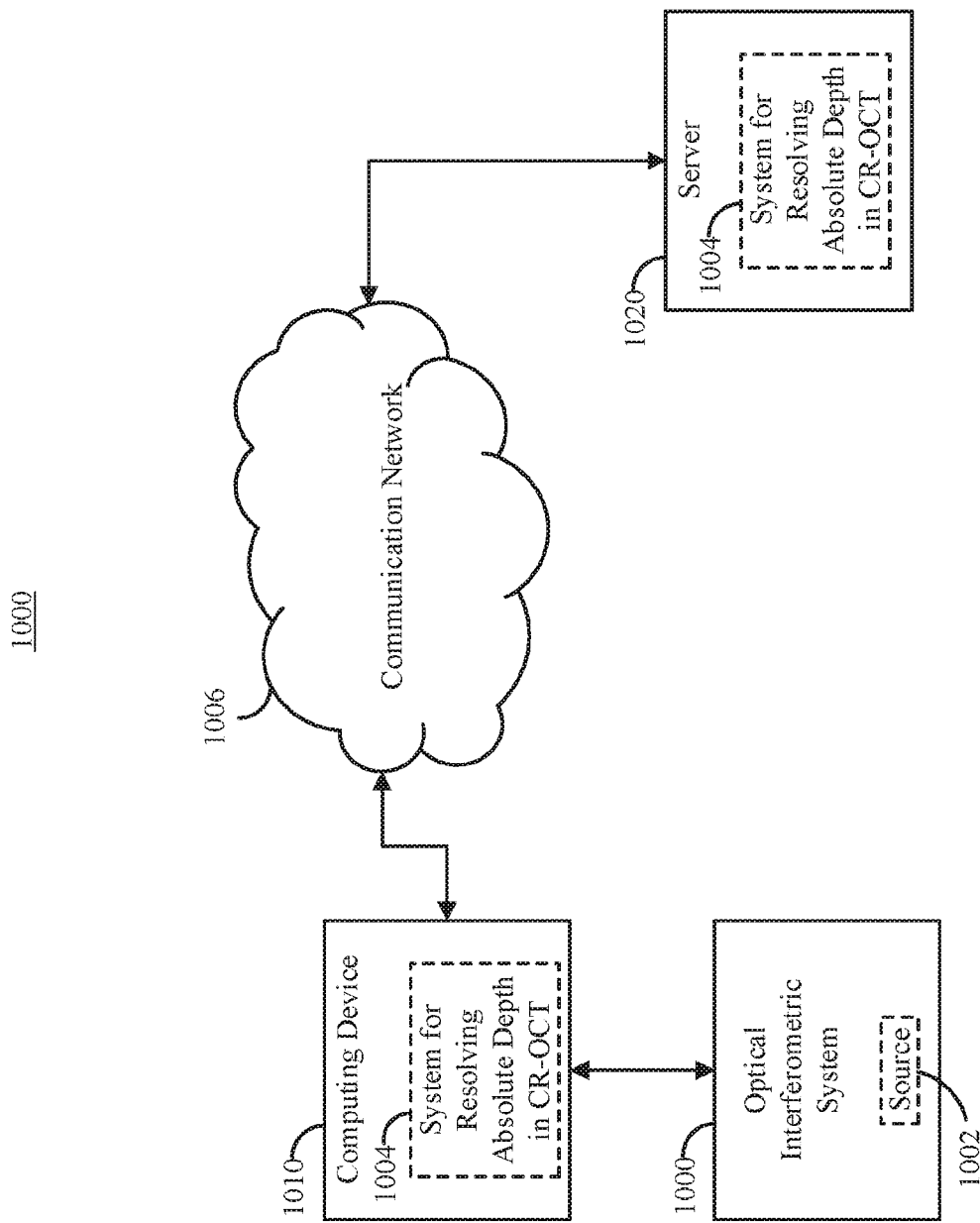
FIG. 10 shows an example of a system for resolving absolute depth in CR-OCT in accordance with some embodiments of the disclosed subject matter.

Turning to FIG. 10, an example 1000 of a system (e.g. a data collection and processing system) for resolving absolute depth in CR-OCT is shown in accordance with some embodiments of the disclosed subject matter. As shown in FIG. 10, a computing device 1010 can receive interferometric data from an optical interferometric system 1000. In some embodiments, computing device 1010 can execute at least a portion of a system for resolving absolute depth 1004 to determine an absolute depth based on the interferometric data received from optical interferometric system 1000. Additionally or alternatively, in some embodiments, computing device 1010 can communicate information about the interferometric data received from optical interferometric system 1000 to a server 1020 over a communication network 1006, which can execute at least a portion of system for resolving absolute depth 1004 to determine absolute depth based on the interferometric data. In some such embodiments, server 1020 can return information to computing device 1010 (and/or any other suitable computing device) indicative of an output of system for resolving absolute depth 1004, such as the absolute depth information. This information may be transmitted and/or presented to a user (e.g. a researcher, an operator, a clinician, etc.) and/or may be stored (e.g. as part of a research database or a medical record associated with a subject).

In some embodiments, computing device 1010 and/or server 1020 can be any suitable computing device or combination of devices, such as a desktop computer, a laptop computer, a smartphone, a tablet computer, a wearable computer, a server computer, a virtual machine being executed by a physical computing device, etc. As described herein, system for resolving absolute depth 1004 can present information about the interferometric data, and/or the absolute depth information to a user (e.g., researcher and/or physician).

In some embodiments, optical interferometric system 1000 may include an electro-magnetic radiation source 1002, which can be any source suitable for optical interferometry such as CR-OCT. In other embodiments, electromagnetic radiation source 1002 can be local to computing device 1010. For example, electro-magnetic radiation source 1002 may be incorporated with computing device 1010 (e.g., computing device 1010 can be configured as part of a device for capturing and/or storing optical interferometric information). As another example, electro-magnetic radiation source 1002 may be connected to computing device 1010 by a cable, a direct wireless link, etc. Additionally or alternatively, in some embodiments, electro-magnetic radiation source 1002 can be located locally and/or remotely from computing device 1010, and can communicate information to computing device 1010 (and/or server 1020) via a communication network (e.g., communication network 1006).

In some embodiments, communication network 1006 can be any suitable communication network or combination of communication networks. For example, communication network 1006 can include a Wi-Fi network (which can include one or more wireless routers, one or more switches, etc.), a peer-to-peer network (e.g., a Bluetooth network), a cellular network (e.g., a 3G network, a 4G network, etc., complying with any suitable standard, such as CDMA, GSM, LTE, LTE Advanced, WiMAX, etc.), a wired network, etc. In some embodiments, communication network 1006 can be a local area network, a wide area network, a public network (e.g., the Internet), a private or semi-private network (e.g., a corporate or university intranet), any other suitable type of network, or any suitable combination of networks. Communications links shown in FIG. 10 can each be any suitable communications link or combination of communications links, such as wired links, fiber optic links, Wi-Fi links, Bluetooth links, cellular links, etc.

Figure 11:
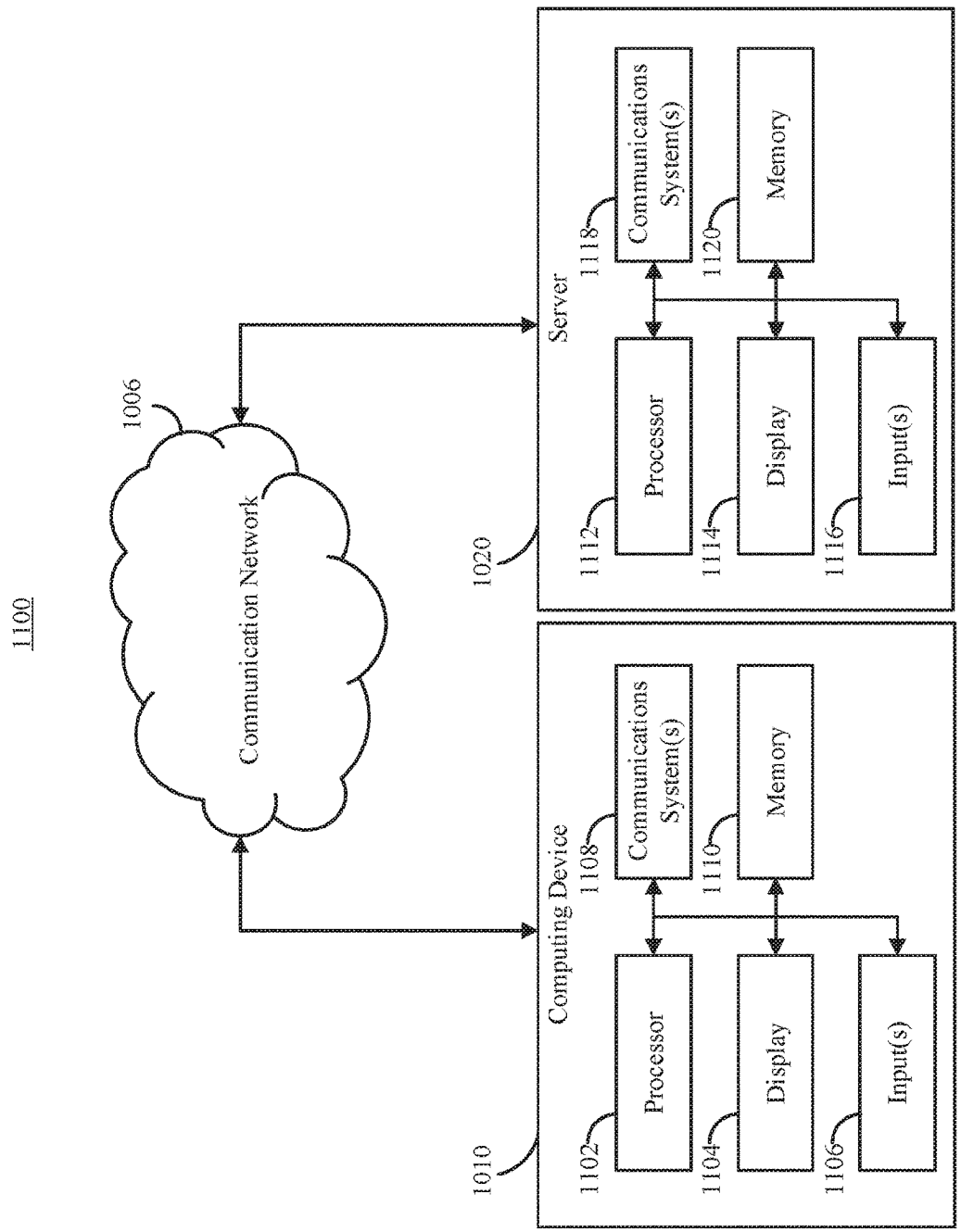
FIG. 11 shows an example of hardware that can be used to implement computing device and server in accordance with some embodiments of the disclosed subject matter.

FIG. 11 shows an example 1100 of hardware that can be used to implement computing device 1010 and server 1020 in accordance with some embodiments of the disclosed subject matter. As shown in FIG. 11, in some embodiments, computing device 1010 can include a processor 1102, a display 1104, one or more inputs 1106, one or more communication systems 1108, and/or memory 1110. In some embodiments, processor 1102 can be any suitable hardware processor or combination of processors, such as a central processing unit, a graphics processing unit, etc. In some embodiments, display 1104 can include any suitable display devices, such as a computer monitor, a touchscreen, a television, etc. In some embodiments, inputs 1106 can include any suitable input devices and/or sensors that can be used to receive user input, such as a keyboard, a mouse, a touchscreen, a microphone, etc.

In some embodiments, communications systems 1108 can include any suitable hardware, firmware, and/or software for communicating information over communication network 1006 and/or any other suitable communication networks. For example, communications systems 1108 can include one or more transceivers, one or more communication chips and/or chip sets, etc. In a more particular example, communications systems 1108 can include hardware, firmware and/or software that can be used to establish a Wi-Fi connection, a Bluetooth connection, a cellular connection, an Ethernet connection, etc.

In some embodiments, memory 1110 can include any suitable storage device or devices that can be used to store instructions, values, etc., that can be used, for example, by processor 1102 to present content using display 1104, to communicate with server 1020 via communications system(s) 1108, etc. Memory 1110 can include any suitable volatile memory, non-volatile memory, storage, or any suitable combination thereof. For example, memory 1110 can include RAM, ROM, EEPROM, one or more flash drives, one or more hard disks, one or more solid state drives, one or more optical drives, etc. In some embodiments, memory 1110 can have encoded thereon a computer program for controlling operation of computing device 1010. In such embodiments, processor 1102 can execute at least a portion of the computer program to present content (e.g., images, user interfaces, graphics, tables, etc.), receive content from server 1020, transmit information to server 1020, etc.

In some embodiments, server 1020 can include a processor 1112, a display 1114, one or more inputs 1116, one or more communications systems 1118, and/or memory 1120. In some embodiments, processor 1112 can be any suitable hardware processor or combination of processors, such as a central processing unit, a graphics processing unit, etc. In some embodiments, display 1114 can include any suitable display devices, such as a computer monitor, a touchscreen, a television, etc. In some embodiments, inputs 1116 can include any suitable input devices and/or sensors that can be used to receive user input, such as a keyboard, a mouse, a touchscreen, a microphone, etc.

In some embodiments, communications systems 1118 can include any suitable hardware, firmware, and/or software for communicating information over communication network 1006 and/or any other suitable communication networks. For example, communications systems 1118 can include one or more transceivers, one or more communication chips and/or chip sets, etc. In a more particular example, communications systems 1118 can include hardware, firmware and/or software that can be used to establish a Wi-Fi connection, a Bluetooth connection, a cellular connection, an Ethernet connection, etc.

In some embodiments, memory 1120 can include any suitable storage device or devices that can be used to store instructions, values, etc., that can be used, for example, by processor 1112 to present content using display 1114, to communicate with one or more computing devices 1010, etc. Memory 1120 can include any suitable volatile memory, non-volatile memory, storage, or any suitable combination thereof. For example, memory 1120 can include RAM, ROM, EEPROM, one or more flash drives, one or more hard disks, one or more solid state drives, one or more optical drives, etc. In some embodiments, memory 1120 can have encoded thereon a server program for controlling operation of server 1020. In such embodiments, processor 1112 can execute at least a portion of the server program to transmit information and/or content (e.g., results of a tissue identification and/or classification, a user interface, etc.) to one or more computing devices 1010, receive information and/or content from one or more computing devices 1010, receive instructions from one or more devices (e.g., a personal computer, a laptop computer, a tablet computer, a smartphone, etc.), etc.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as RAM, Flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

In some embodiments, the optical signals are detected by photodiodes. It should be recognized that any opto-electronic conversion device including but not limited to photo detectors, photodiodes, line-scan and two-dimensional cameras, and photodiode arrays can be used to perform this detection function.

It should be noted that, as used herein, the term mechanism can encompass hardware, software, firmware, or any suitable combination thereof.

Figure 12:
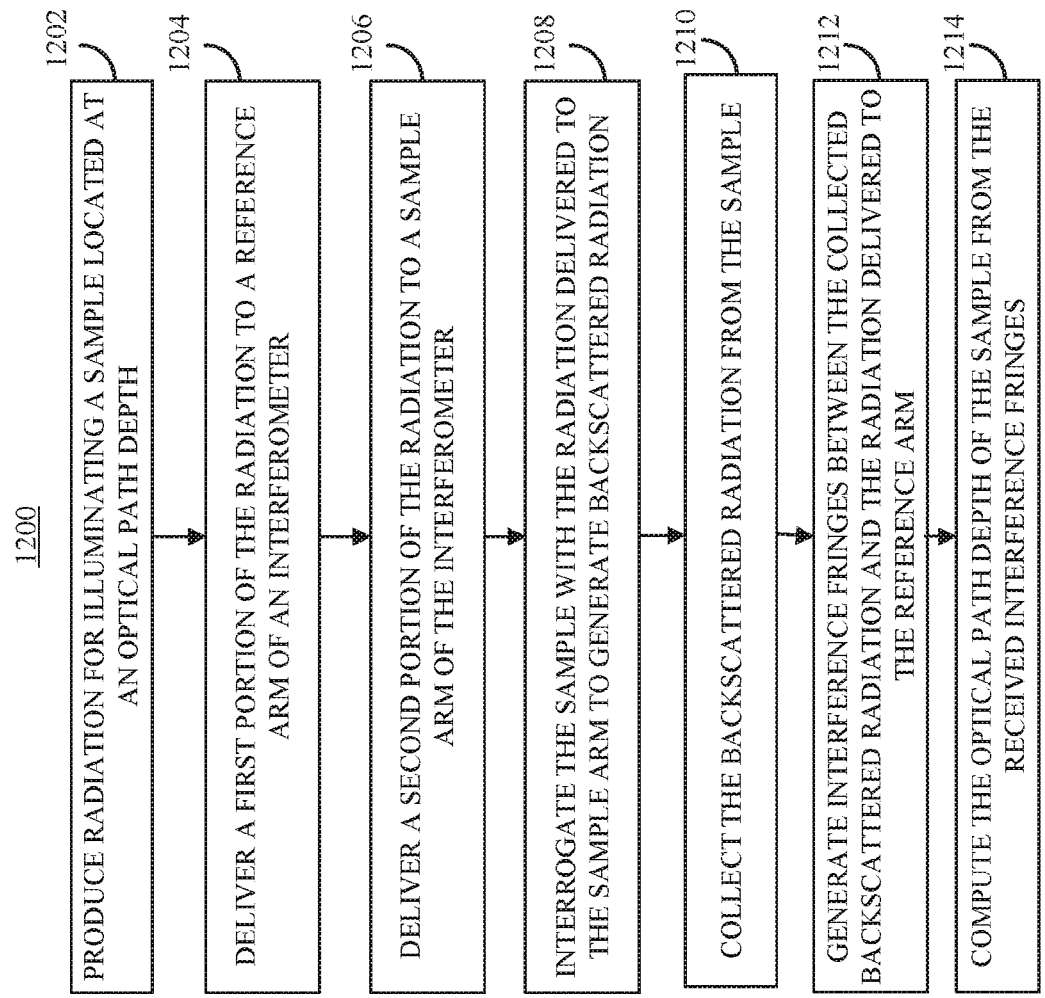
FIG. 12 shows an example of a process for resolving absolute depth in CR-OCT in accordance with some embodiments of the disclosed subject matter.

FIG. 12 shows an example 1200 of a process for resolving absolute depth in CR-OCT in accordance with some embodiments of the disclosed subject matter. As shown in FIG. 12, at 1202, process 1200 can produce radiation for illuminating a sample located at an optical path depth, where the electromagnetic radiation source may provide the radiation to the sample to facilitate determining the optical path depth within the sample. At 1204, process 1200 can deliver a first portion of the radiation to a reference arm of an interferometer. At 1206, process 1200 can deliver a second portion of the radiation to a sample arm of the interferometer. At 1208, process 1200 can interrogate the sample with the radiation delivered to the sample arm to generate backscattered radiation. At 1210, process 1200 can collect the backscattered radiation from the sample. At 1212, process 1200 can generate interference fringes between the collected backscattered radiation and the radiation delivered to the reference arm. Finally, at 1214, process 1200 can compute the optical path depth of the sample from the received interference fringes.

It should be understood that the above described steps of the process of FIG. 12 can be executed or performed in any order or sequence not limited to the order and sequence shown and described in the figures. Also, some of the above steps of the processes of FIG. 12 can be executed or performed substantially simultaneously where appropriate or in parallel to reduce latency and processing times.

Thus, while the invention has been described above in connection with particular embodiments and examples, the invention is not necessarily so limited, and that numerous other embodiments, examples, uses, modifications and departures from the embodiments, examples and uses are intended to be encompassed by the claims attached hereto.

What is claimed is:

1. An apparatus, comprising:
an electromagnetic radiation source producing radiation for illuminating a sample located at an optical path depth,
the electromagnetic radiation source providing the radiation to the sample to facilitate determining the optical path depth within the sample;
an interferometer including:
a reference arm to which a first portion of the radiation is delivered,
a sample arm to which a second portion of the radiation is delivered,
a first optical subsystem coupled to the sample arm to interrogate the sample with the radiation delivered to the sample arm and to collect backscattered radiation from the sample, and
a second optical subsystem coupled to the reference arm and the first optical subsystem to generate interference fringes between the collected backscattered radiation and the radiation delivered to the reference arm; and
a data collection and processing system in communication with the interferometer configured to compute the optical path depth of the sample from the generated interference fringes,
wherein the electromagnetic radiation source comprises a chirped frequency comb source, and
wherein the data collection and processing system is configured to:
analyze the interference fringes to generate a first point-spread function (PSF) associated with a first wavelength band and a second PSF associated with a second wavelength band different from the first wavelength band,
calculate a shift between the first PSF and the second PSF, and
determine the optical path depth within the sample based on the shift.

2. The apparatus of claim 1, wherein the frequency comb source generates a first frequency comb having a first free spectral range (FSR) and a second frequency comb having a second FSR different from the first FSR.

3. The apparatus of claim 2, wherein the data collection and processing system is configured to:
obtain a first set of interferometric data using the first frequency comb,
obtain a second set of interferometric data using the second frequency comb,
determine a phase shift between the first set of interferometric data and the second set of interferometric data, and
determine the optical path depth of the sample based on the phase shift.

4. The apparatus of claim 1, wherein the frequency comb source comprises a stepped frequency comb having a free spectral range,
wherein the frequency comb comprises a plurality of frequency comb lines, and
wherein the frequency comb lines are modulated by a particular amount to generate a change in frequency.

5. The apparatus of claim 4, wherein the data collection and processing system is configured to:
obtain a first set of interferometric data without modulation of the frequency comb lines,
obtain a second set of interferometric data with modulation of the frequency comb lines, determine a phase shift between the first set of interferometric data and the second set of interferometric data caused by modulation of the frequency comb lines, and determine the optical path depth of the sample based on the phase shift.

6. The apparatus of claim 1, wherein the electromagnetic radiation source further comprises a continuously swept source, and wherein the data collection and processing system is configured to:

obtain a first set of interferometric data using the frequency comb source, obtain a second set of interferometric data using the continuously swept source, determine a swept source optical path depth within the sample based on the second set of interferometric data, and determine the optical path depth of the sample based on referencing the swept source optical path depth to the first set of interferometric data.

7. The apparatus of claim 1, wherein the electromagnetic radiation source comprises a stretched-pulse active mode-locked laser.

8. The apparatus of claim 1, wherein the electromagnetic radiation source comprises a dispersive Fabry-Perot etalon filter.

9. The apparatus of claim 8, wherein the Fabry-Perot etalon filter comprises a Si-wafer.

10. The apparatus of claim 1, wherein the first optical subsystem comprises an optical circulator circuit to route the radiation to the sample and the backscattered radiation from the sample to optical waveguides.

11. The apparatus of claim 1, wherein the reference arm comprises an active phase modulator to perform complex demodulation of the interference fringes.

12. The apparatus of claim 1, wherein the data collection and processing system, when computing the optical path depth of the sample, is further configured to compute a plurality of optical path delays of the sample corresponding to a plurality of optical path depths within the sample.

13. A method, comprising:

producing, by an electromagnetic radiation source, radiation for illuminating a sample located at an optical path depth, the electromagnetic radiation source providing the radiation to the sample to facilitate determining the optical path depth within the sample;

delivering, by the electromagnetic radiation source, a first portion of the radiation to a reference arm of an interferometer;

delivering, by the electromagnetic radiation source, a second portion of the radiation to a sample arm of the interferometer;

interrogating, by a first optical subsystem coupled to the sample arm, the sample with the radiation delivered to the sample arm to generate backscattered radiation;

collecting, by the first optical subsystem, the backscattered radiation from the sample, generating, by a second optical subsystem coupled to the reference arm and the first optical subsystem, interference fringes between the collected backscattered radiation and the radiation delivered to the reference arm;

computing, by a data collection and processing system in communication with the interferometer, the optical path depth of the sample from the generated interference fringes, wherein the electromagnetic radiation source comprises a chirped frequency comb source;

analyzing, by the data collection and processing system, the interference fringes to generate a first point-spread function (PSF) associated with a first wavelength band and a second PSF associated with a second wavelength band different from the first wavelength band;

calculating, by the data collection and processing system, a shift between the first PSF and the second PSF; and determining, by the data collection and processing system, the optical path depth within the sample based on the shift.

14. The method of claim 13, further comprising:

generating, by the frequency comb source, a first frequency comb having a first free spectral range (FSR) and a second frequency comb having a second FSR different from the first FSR.

15. The method of claim 14, further comprising:

obtaining, by the data collection and processing system, a first set of interferometric data using the first frequency comb, obtaining, by the data collection and processing system, a second set of interferometric data using the second frequency comb, determining, by the data collection and processing system, a phase shift between the first set of interferometric data and the second set of interferometric data, and determining, by the data collection and processing system, the optical path depth of the sample based on the phase shift.

16. The method of claim 13, wherein the frequency comb source comprises a stepped frequency comb having a free spectral range, and wherein the frequency comb comprises a plurality of frequency comb lines, and wherein the method further comprises:

modulating the frequency comb lines by a particular amount to generate a change in frequency.

17. The method of claim 16, further comprising:

obtaining, by the data collection and processing system, a first set of interferometric data without modulation of the frequency comb lines, obtaining, by the data collection and processing system, a second set of interferometric data with modulation of the frequency comb lines, determining, by the data collection and processing system, a phase shift between the first set of interferometric data and the second set of interferometric data caused by modulation of the frequency comb lines, and determining, by the data collection and processing system, the optical path depth of the sample based on the phase shift.

18. The method of claim 13, wherein the electromagnetic radiation source further comprises a continuously swept source, and wherein the method further comprises:

obtaining, by the data collection and processing system, a first set of interferometric data using the frequency comb source, obtaining, by the data collection and processing system, a second set of interferometric data using the continuously swept source, determining, by the data collection and processing system, a swept source optical path depth within the sample based on the second set of interferometric data, and determining, by the data collection and processing system, the optical path depth of the sample based on referencing the swept source optical path depth to the first set of interferometric data.

19. The method of claim 13, wherein the electromagnetic radiation source comprises a stretched-pulse active mode-locked laser.

20. The method of claim 13, wherein the electromagnetic radiation source comprises a dispersive Fabry-Perot etalon filter.

21. The method of claim 20, wherein the Fabry-Perot etalon filter comprises a Si-wafer.

22. The method of claim 13, wherein the first optical subsystem comprises an optical circulator circuit to route the radiation to the sample and the backscattered radiation from the sample to optical waveguides.

23. The method of claim 13, wherein the reference arm comprises an active phase modulator to perform complex demodulation of the interference fringes.

24. The method of claim 13, wherein computing the optical path depth of the sample farther comprises computing a plurality of optical path delays of the sample corresponding to a plurality of optical path depths within the sample.

* * * * *